United States Patent [19]

Sung

[11] Patent Number: 5,215,552
[45] Date of Patent: Jun. 1, 1993

[54] SOL-GEL ALUMINA ABRASIVE GRAIN

[75] Inventor: Jason Sung, Northborough, Mass.

[73] Assignee: Norton Company, Worcester, Mass.

[21] Appl. No.: 840,968

[22] Filed: Feb. 26, 1992

[51] Int. Cl.⁵ .............................................. B24D 3/00
[52] U.S. Cl. ........................................ 51/293; 51/309
[58] Field of Search .................................. 51/293, 309

[56] References Cited

U.S. PATENT DOCUMENTS

| | | | |
|---|---|---|---|
| 4,623,364 | 11/1986 | Cottringer et al. | 51/309 |
| 4,964,883 | 10/1990 | Morris et al. | 51/293 |
| 4,988,370 | 1/1991 | Haynes, Jr. | 51/309 |
| 4,997,461 | 3/1991 | Markhoff-Matheny | 51/293 |
| 5,009,676 | 4/1991 | Rue et al. | 51/309 |
| 5,035,723 | 7/1991 | Kalinowski et al. | 51/309 |
| 5,035,724 | 7/1991 | Pukari et al. | 51/309 |
| 5,037,453 | 8/1991 | Darayanan et al. | 51/309 |
| 5,103,598 | 4/1992 | Kelly | 51/309 |
| 5,104,424 | 4/1992 | Hickory et al. | 51/309 |
| 5,110,322 | 5/1992 | Darayanan et al. | 51/293 |

*Primary Examiner*—Mark L. Bell
*Assistant Examiner*—Willie J. Thompson
*Attorney, Agent, or Firm*—David Bennett

[57] ABSTRACT

A sol-gel alumina abrasive grain with valuable grinding characteristics is obtained by inducing microcracking in the grain surfaces.

14 Claims, 6 Drawing Sheets

150X
QUENCHED
750°C
WATER

FIG.1a  150X UNQUENCHED
FIG.1b  150X QUENCHED 750°C WATER
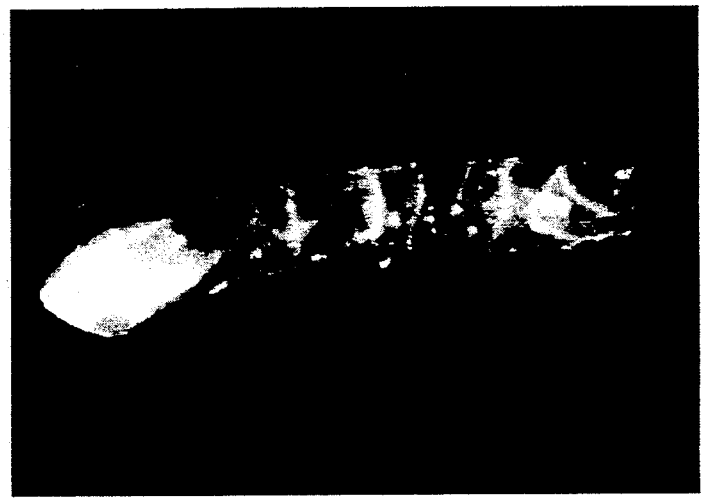
FIG.1c  100X QUENCHED 500°C WATER

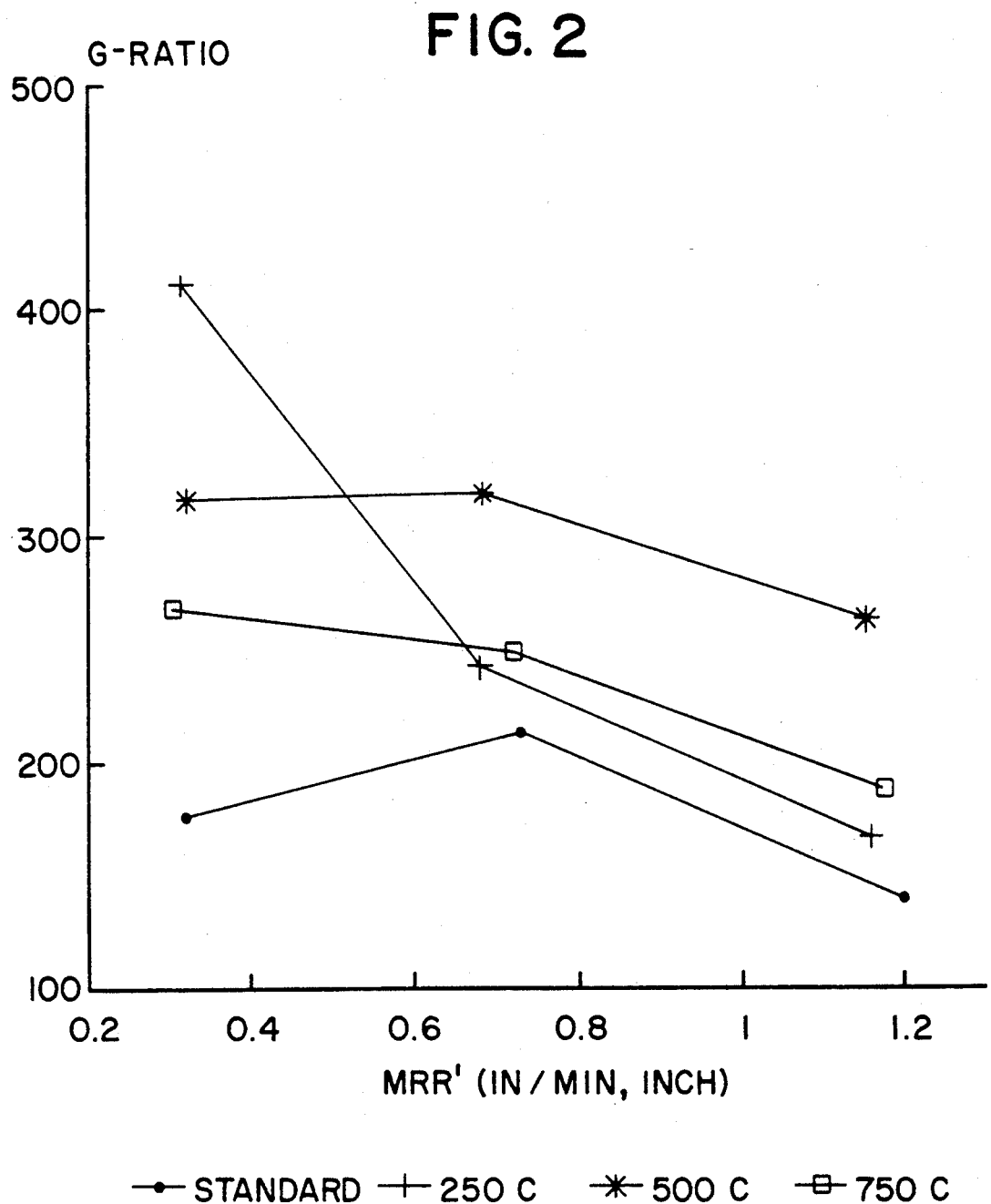

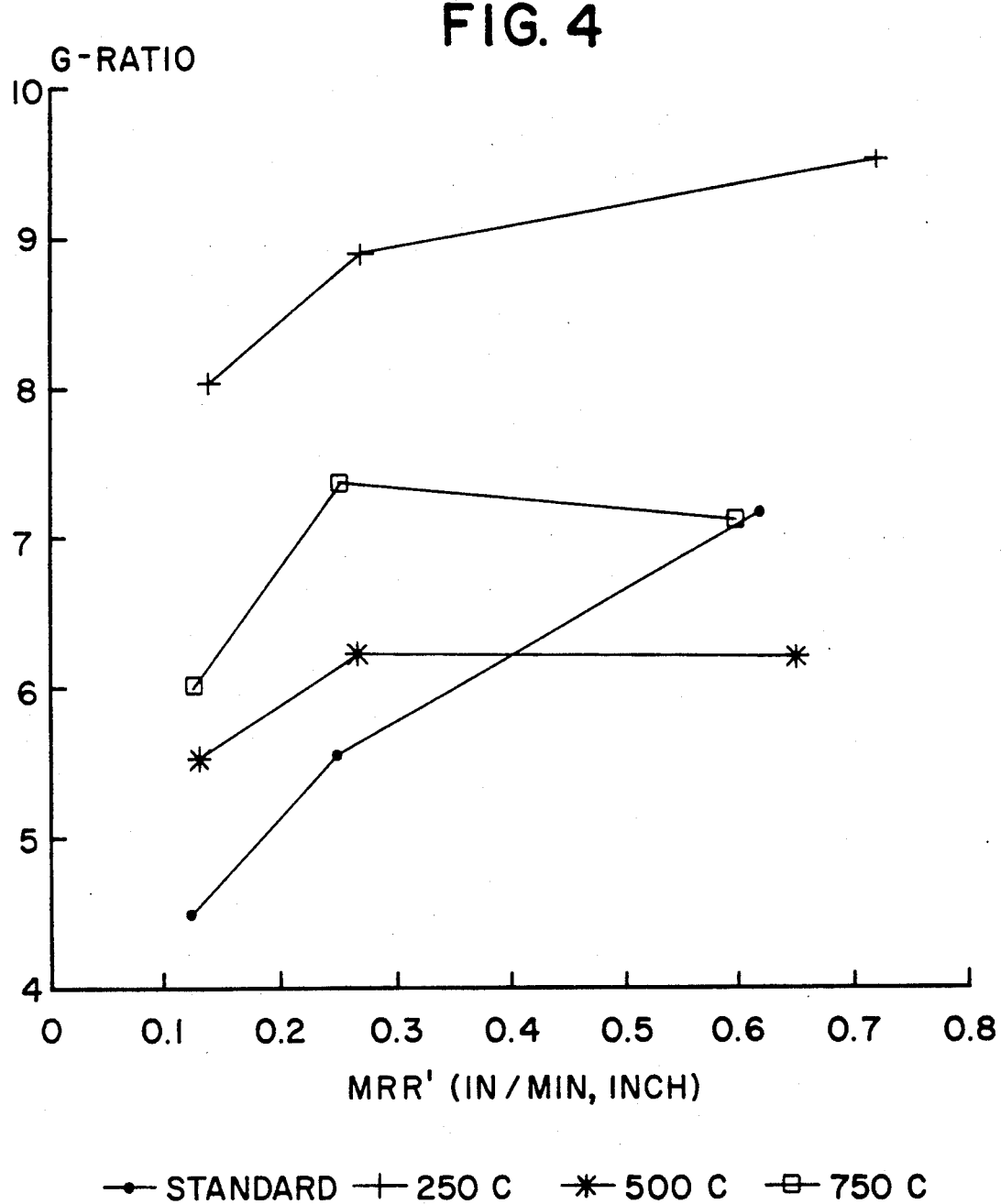

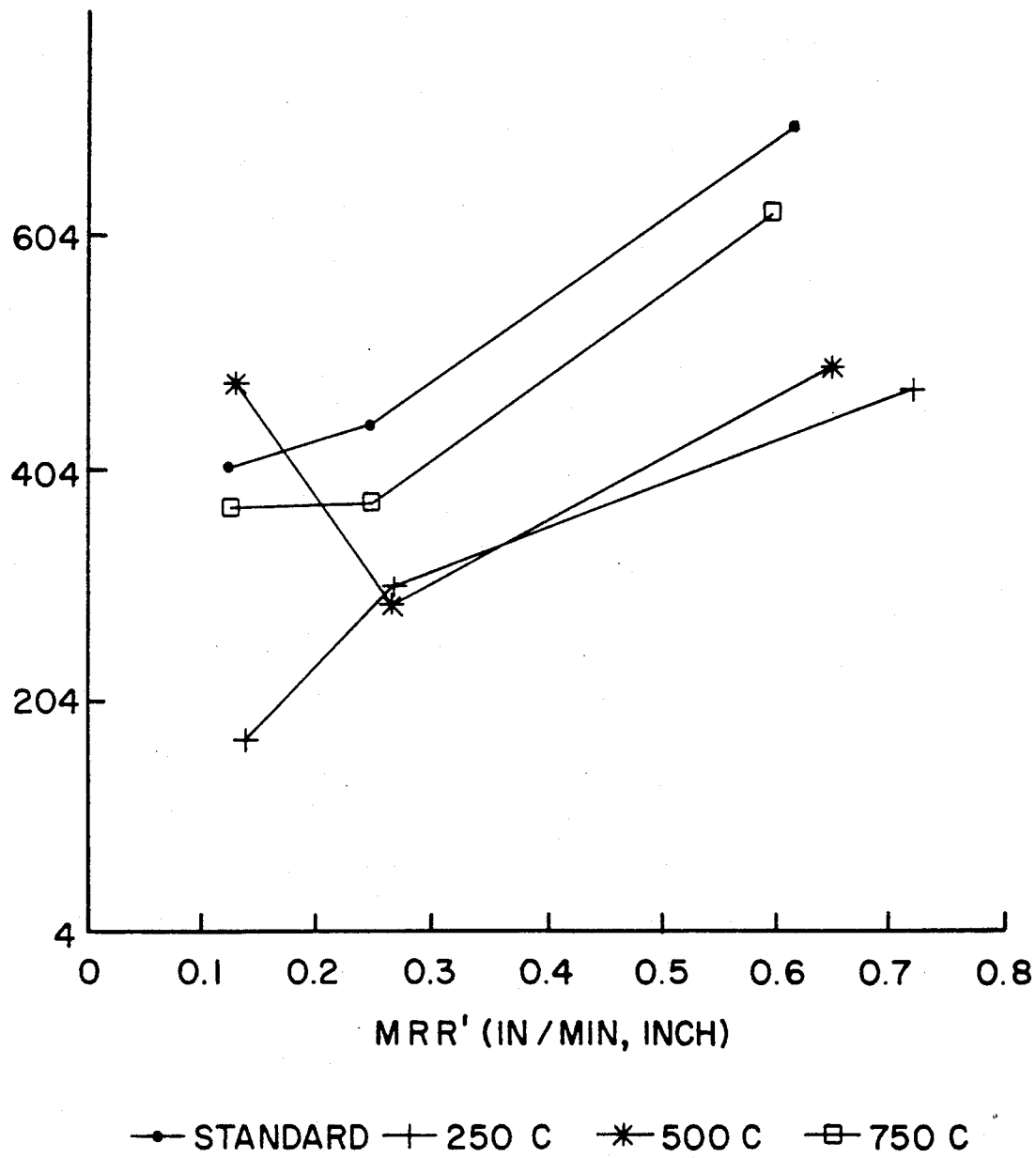

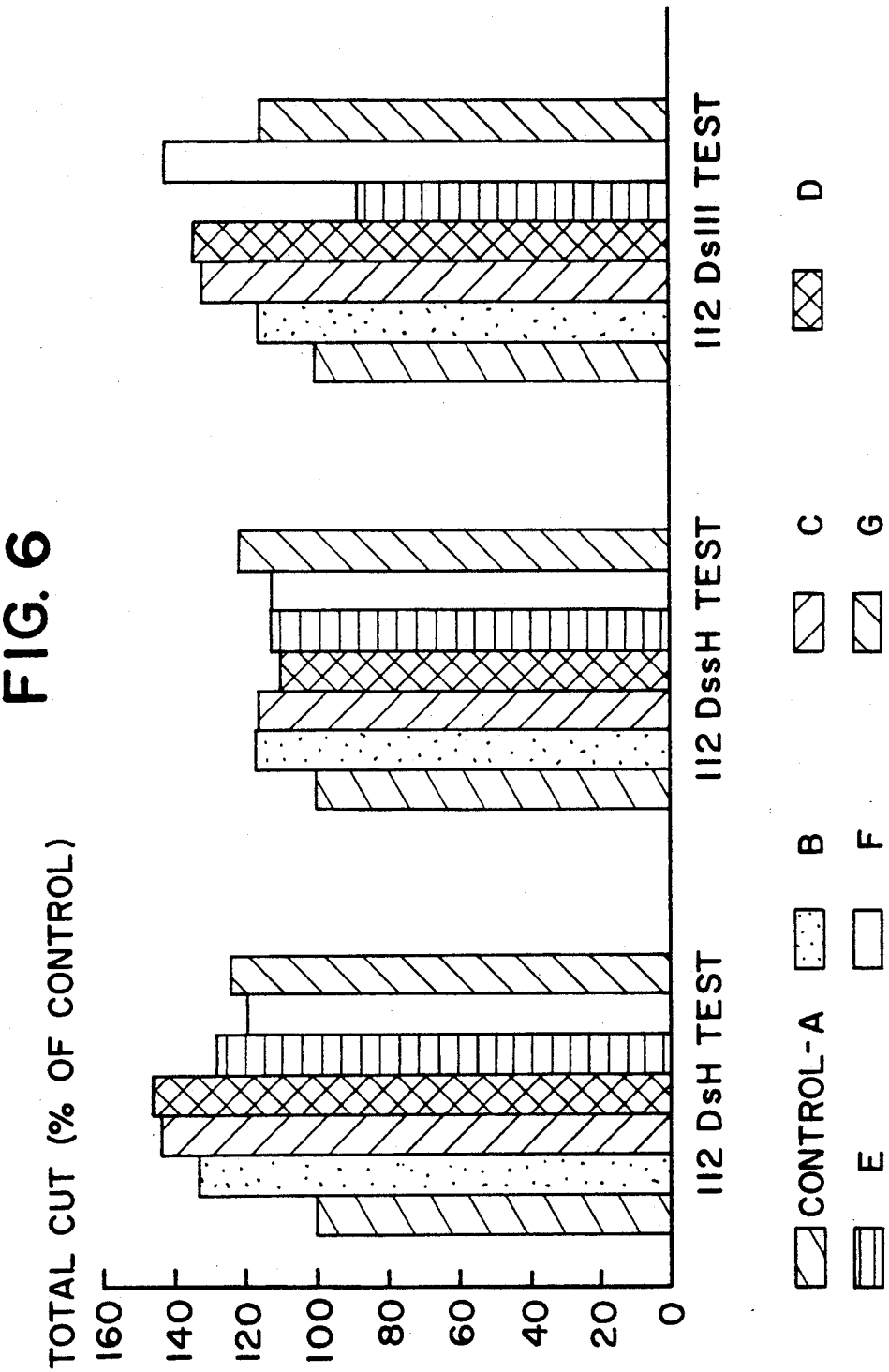

SOL-GEL ALUMINA ABRASIVE GRAIN

BACKGROUND OF THE INVENTION

This invention relates to abrasive grain made from a sol-gel alumina that has improved abrasive qualities both in bonded and in coated applications.

In recent years there has been a good deal of interest in the development of sol-gel alumina abrasives. These are made by forming a sol of aluminum oxide monohydrate, (boehmite), gelling the sol, drying it and then firing the dried material to give alpha alumina. This has the advantage, inter alia, of producing a finer crystalline structure which correlates with improved abrasive performance. Such a basic process was described for example in U.S. Pat. No. 4,314,827. The crystal size within such products is generally below about 10 microns. Later it was found that this crystal size could be reduced by about an order of magnitude, with corresponding improvements in the abrasive qualities, if the sol-gel was seeded with a material that promotes the growth of the alpha alumina final product. This produced the "seeded sol-gel" process improvement that has had a great deal of commercial success in recent years and is described in U.S. Pat. No. 4,623,364.

Another development that has significant potential is the invention of sol-gel alumina abrasive filaments. These are abrasive particles that have a generally uniform cross-sectional shape about an axis, with an aspect ratio of greater than 1. The aspect ratio is the axial length divided by the greatest dimension perpendicular to that axis. Such particles are preferably made by a seeded sol-gel alumina process.

As explained above such sol-gel aluminas perform at a much higher performance level than the earlier fused aluminas. One occasional problem however has been the fact that the grains are strong and insufficiently friable. A "friable" grain, as the term is used herein, describes a grain that continuously exposes new cutting edges as a result of fracture under the grinding load. Grains that lack friability perform best under the most aggressive cutting conditions and tend to leave a surface finish that is rougher than might be acceptable for some applications.

Traditionally this is overcome by grinding during the finishing stages with a finer grain abrasive and this is still effective with sol-gel alumina grains. It would be desirable however if the amount of finishing that is required could be minimized.

Another consequence of the extremely aggressive cutting action of the sol-gel alumina abrasive grains is that the advantages they bring are not so readily apparent under low pressure grinding conditions.

There is therefore a need for an abrasive sol-gel alumina abrasive grain that will perform well at relatively low pressure grinding conditions and will leave a smoother finish on the ground surface.

The present invention describes a product, and a process for making such a product, that has the very advantageous friability and is therefore suitable for low pressure grinding.

DESCRIPTION OF THE INVENTION

The present invention provides a sol-gel alumina abrasive grain having a microcrack density of from about 10 to about 200 microcracks per square millimeter of the surface area of the grain.

A "microcrack" is defined as being less than about 200 microns in length and less than 10 microns in width. These microcracks, when present within the above density range, seem to produce lines of weakness in the structure of the grain. The result is that, under grinding conditions, controlled fracture revealing new cutting surfaces occurs at a somewhat lower applied load level than in the absence of such microcracks. The preferred microcrack dimensions are from about 10 to about 100 microns in length, and about 1 to about 5 microns in width.

The microcrack density can be from about 10 to about 200, and preferably form about 50 to about 150 per square millimeter of the grain surface and this should most suitably represent an even distribution over the whole surface of the grain in the form of an interconnected network. The distribution is at least in part affected by the means by which the cracks are induced, and this feature should be considered in designing a technique for producing the microcrack pattern in the grains of the invention.

Preferably also there should be a substantial absence of "macrocracks", defined as having dimensions greater than those specified above to characterize "microcracks", since these tend to result in an inherent and more fundamental degradation in the grain than is desirable. Clearly a few such macrocracks would be acceptable but the number would depend on their dimensions. Thus while there might be as many as 50% as many borderline macrocracks as there are microcracks, the presence of as many as 5% of very long and wide macrocracks would significantly diminish the advantages of the microcracks in the grains of the invention.

The microcracks can be produced in any desired manner but the preferred manner, which provides a further aspect of this invention, comprises rapidly quenching a sol-gel alumina abrasive grain through from about 200° C. up to about 1000° C.

In the process of the invention the heat content, and hence the temperature, of the abrasive grains can be reduced by any suitable means such as immersing the heated grain into a liquid at a lower temperature or by exposing it to an air flow at a lower temperature. The rapidity of the quench will be determined by the process. Where a liquid quench is used the grain is dumped into the liquid at the lower temperature. The time to reach thermal equilibrium is determined by the heat transfer characteristics of the liquid and the grains under those conditions. Where an air quench is used, the time will be correspondingly longer to reflect the slower rate to reach thermal equilibrium under such conditions. Thus the term "rapid quench" is intended to indicate that thermal equilibrium between the heated grains and the quenching medium is reached in one step at a rapid rate.

The preferred quench reduces the temperature by from about 250° C. up to about 500° C. and the preferred quench medium is water, and more preferably brine, since this has a higher heat capacity than water alone. Other liquids such as oils or other organic liquids can be used but it is obviously desirable that they be non-volatile, non-toxic and non-flammable for safety and economy reasons. Air quenching can be performed by exposing a bed of the grain to a flow of compressed air while the grain bed is agitated to facilitate contact of the air flow with all the grains. Such a quench can take up to 5 minutes or more to complete, depending on the amount of the grain, the efficiency of the contact and the temperature of the quench air.

The advantages of the present invention are most apparent with finer rather than coarser grain sizes and the preferred microcracked grains of the invention have a grit size of about 50 grit and more preferably 80 grit, or finer. It is found that filamentary abrasive particles, where the grit size is taken as corresponding to the greatest dimension of the cross-section perpendicular to the axis of the filament, are particularly suitable for the invention. Thus filamentary abrasive particles that have the required microcrack density are a preferred feature of the present invention. The grains can be incorporated into any suitable form of abrasive article, both coated and bonded, and may be used as the sole abrasive or in admixture with other abrasive grains. It is also found that the grain of the invention produces the most marked improvement in low pressure grinding applications of coated abrasives and in vitreous bonded abrasive products.

DESCRIPTION OF THE DRAWINGS

FIG. 1 comprises photographs of filamentary abrasive grains before quenching and after treatment to induce microcracking and steeping in dye to allow the cracks to become visible. The unquenched grain is shown at 150× magnification (FIG. 1a) and the photographs of the quenched grains are at 100×, (500° C./water), (FIG. 1b) and 150×, (750° C./water) (FIG. 1c).

FIG. 2 is a graph of G-Ratio against metal removal rate showing improved grinding performance for the microcracked grains of the invention on 52100 steel.

FIGS. 4 and 5 are graphs that show the same comparisons as form the basis for FIGS. 2 and 3 except that the tests were performed on different steel.

FIG. 6 is a series of bar graphs showing the improvement over a standard, of abrasive discs using the grains of the invention.

DESCRIPTION OF THE PREFERRED EMBODIMENTS

Figure 3:
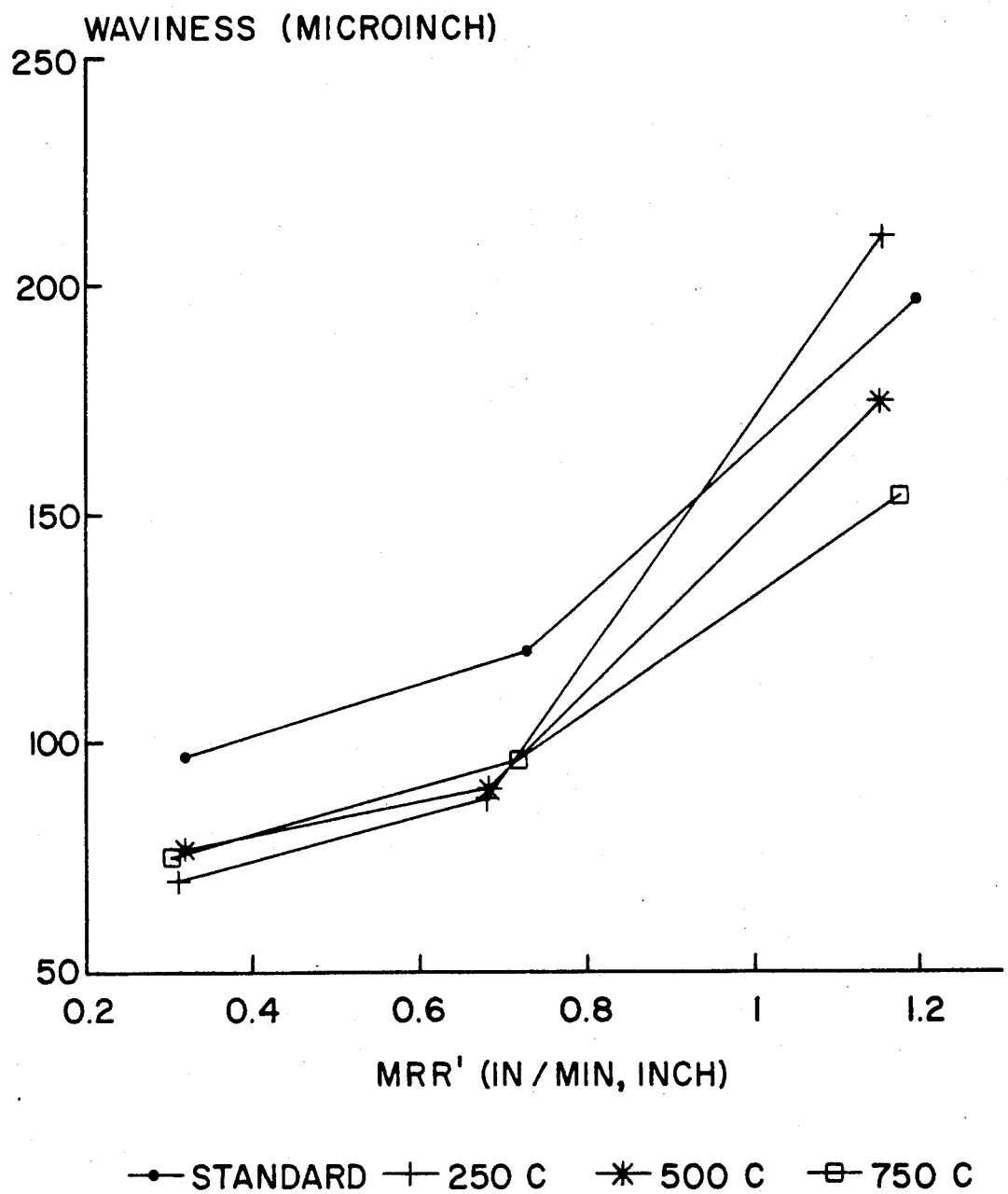
FIG. 3 is a graph which shows the improved waviness obtainable with the grits of the invention under the same conditions as pertain to FIG. 2.

The invention is now further described with reference to specific embodiments which are intended for the purpose of illustration only and are intended to imply no necessary limitation on the essential scope of the invention.

EXAMPLE 1

In this Example, a filamentary abrasive grain made from a seeded sol-gel alumina by a process as described in U.S. Pat. No. 5,009,676 was heated to 500° C. and then dumped into water at room temperature. The grain was then steeped in a dye to reveal the microcrack pattern obtained. The quenched grain was then examined under a microscope which revealed that the cracks induced were individually less than 200 microns in length and were apparently not open cracks at the magnification used. In practice this means that they were of the order of ten microns or less. The crack density was about 80 per square mm. FIG. 1 is a photograph of the grain at a magnification of 100×.

EXAMPLE 2

This Example demonstrates that the presence of the microcracks in grains such as those produced in Example 1, translates into enhanced grinding performance. The grains evaluated were filamentary grains with a nominal grit size of 120. For filamentary grains, the grit size is determined by the largest dimension of the axial cross section. These grains are of the type illustrated, in FIG. 1 of the Drawings. The grains were made by a process as described in U.S. Pat. No. 5,009,676 and were incorporated in a vitreous bonded grinding wheel. In each case the amount of the vitreous bond, the proportions of bond and grain and the percentage void in the finished product were kept the same. The only differences were that in some cases the grains were microcracked by quenching before incorporation. In each case the wheels were tested in the same creep feed grinding rig, using identical procedures, on 52100 steel.

The wheels tested contained grains treated as follows:
  a. Untreated;
  b. 250° C..Quenched into water at room temperature.
  c. 500° C..Quenched into water at room temperature.
  d. 750° C..Quenched into water at room temperature.

The graphs attached as FIGS. 2 and 3 show plots of G-Ratio against metal removal rate, and waviness against metal removal rate respectively. "G-Ratio" is the ratio of metal removal rate to wheel wear rate. In this set of tests, the higher the G-Ratio at a given metal removal rate, the better the wheel is grinding. Waviness is measured in microinches and is a measure of the roughness of the surface, with lower values indicating a smoother surface.

As can be seen, the products quenched at the two higher temperatures invariably performed better in terms of G-Ratio and waviness than the unquenched grain. The product quenched from 250° C. also performed better except for the waviness at high metal removal rates.

The same wheels were tested in the same creep feed application but applied to M7 steel. Graphs corresponding to those in FIGS. 2 and 3, are presented as FIGS. 4 and 5. In this series of tests the wheel containing the grain quenched at 250° C. was consistently the best at both G-Ratio and waviness. The wheel containing the grain quenched at 500° C. had a better G-Ratio than the one with the unquenched grain at lower metal removal rates but had a worse waviness at the lowest metal removal rate. The grain quenched from the highest temperature performed at least as well and, most often, significantly better than the unquenched product at all metal removal rates, for both G-Ratio and waviness.

EXAMPLE 3

This Example describes the relative performance of thermally quenched, and unquenched, seeded sol-gel alumina abrasive grains in a coated abrasive application. The tests performed were three in number corresponding to different ways of evaluating coated abrasive discs.

In the first test an abrasive disc if forced at high pressure against a steel angle iron for a fixed time. The amount of metal worn in that time is measured.

The second test is like the first, but performed on a stainless steel angle iron.

The third test involves the low pressure grinding of a 3 inch steel plate. The test is ended when the disc fails to cut at a predetermined rate in a fixed period.

The grains evaluated were 50 grit in size and were adhered to the same standard type of treated fiber backing by conventional phenolic resin maker and size coats.

Six different grains were evaluated. All were 50 grit seeded sol-gel alumina abrasive grains of irregular grit shape conventionally used in coated abrasives. The samples are identified as follows:

A. Standard. All others are measured as percentages with the performance of this grain taken as 100% The parameter measured is the amount of metal cut in a fixed period using a standard set of grinding conditions. This therefore gives an accurate account of the improvement caused by the quenching process.

B. Grain quenched from 250° C. in air.
C. Grain quenched from 250° C. into water at room temperature.
D. Grain quenched from 500° C. in air.
E. Grain quenched from 500° C. into water at room temperature.
F. Grain quenched from 750° C. in air.
G. Grain quenched from 750° C. into water at room temperature.

The water quench was done by dumping the heated grain into room temperature water. This clearly represents a very drastic quench and was found very effective. The air quench was done by spreading the grain into a thin layer on a cool, flat surface and passing a rapid flow of air at room temperature over the grain.

The results obtained are summarized in the bar graph chart attached as FIG. 6. The chart shows a pattern of overall improvement of as much as 40% over the standard. The anomalous result with the 500° C./water quench in the third set of bars, is believed to be the result of an experimental slip in the quenching procedure. It is certainly unrepresentative of the performance of the quenched grain.

From the data presented it is clear that quenching sol-gel alumina abrasive grains yields significant improvements in grinding performance when those grains are used in both coated and bonded abrasive applications.

What is claimed is:

1. A sol-gel alumina abrasive grain having from about 10 to about 200 microcracks per square millimeter of the surface of the grain.

2. An abrasive grain according to claim 1 having from about 50 to about 150 microcracks per square millimeter of the grain surface in the form of an interconnected network.

3. An abrasive grain according to claim 1 which is formed from a seeded sol-gel alumina.

4. An abrasive grain according to claim 1 in the form of a filamentary particle.

5. An abrasive grain according to claim 1 having a grain size of 50 grit or finer.

6. A seeded sol-gel alumina filamentary abrasive grain having from about 10 to about 200 microcracks per square millimeter of the grain surface in the form of an interconnected network.

7. A process for the production of a sol-gel alumina abrasive grain having from about 10 to about 200 microcracks per square millimeter of the grain surface which comprises heating the grain to an elevated temperature and then quenching the grain to a temperature that is from about 200° C. to about 1000° C. lower.

8. A process according to claim 7 in which the grain is quenched by immersing it in water.

9. A process according to claim 7 in which the quenching reduces the temperature of the grain by from about 200° C. to about 500° C.

10. A process according to claim 7 in which the grain comprises a seeded sol-gel alumina.

11. A process according to claim 7 in which the grain is a seeded sol-gel alumina filamentary abrasive grain.

12. A process for the production of a seeded sol-gel alumina filamentary abrasive grain having from at least 50 to about 150 microcracks per square millimeter of the grain surface in the form of an interconnected network, which comprises quenching the grain from a temperature of from about 250° C. to about 750° C. by dumping it into water at about room temperature.

13. An abrasive article comprising a grain according to claim 1.

14. An abrasive article comprising a grain according to claim 6.

* * * * *